(12) United States Patent
Sindhwani et al.

(10) Patent No.: US 7,562,060 B2
(45) Date of Patent: Jul. 14, 2009

(54) LARGE SCALE SEMI-SUPERVISED LINEAR SUPPORT VECTOR MACHINES

(75) Inventors: Vikas Sindhwani, Chicago, IL (US); Sathiya Keerthi Selvaraj, South Pasadena, CA (US)

(73) Assignee: Yahoo! Inc., Sunnyvale, CA (US)

( * ) Notice: Subject to any disclaimer, the term of this patent is extended or adjusted under 35 U.S.C. 154(b) by 320 days.

(21) Appl. No.: 11/394,744

(22) Filed: Mar. 31, 2006

(65) Prior Publication Data

US 2007/0239642 A1 Oct. 11, 2007

(51) Int. Cl.
*G06N 3/08* (2006.01)
*G06E 1/00* (2006.01)

(52) U.S. Cl. .............................. 706/25; 706/17; 706/20

(58) Field of Classification Search .................. 706/25, 706/17, 20; 708/441, 440
See application file for complete search history.

(56) References Cited

U.S. PATENT DOCUMENTS

2003/0093004 A1* 5/2003 Sosa et al. .................. 600/544

OTHER PUBLICATIONS

Fung et al., Glenn, "Semi-Supervised Support Vector Machines for Unlabeled Data Classification", 2001.*
Fung et al., Glenn, "Finite Newton for Lagrangian Support Vector Machine Classification", 2003.*
Sindhwani et al., Vikas, "A Co-Regularization Approach to Semi-supervised Learning with Multiple Views", 2005.*
Sindhwani et al., Vikas, "Linear Manifold Regularization for Large Scale Semi-supervised Learning", 2005.*
Keerthi et al., Sathiya, "A Modified Finite Newton Method for Fast Solution of Large Scale Linear SVMs", 2005.*
Christopher J. C. Burges, (1998) "A Tutorial on Support Vector Machines for Pattern Recognition". Data Mining and Knowledge Discovery 2:121—167, pp. 1-43.

* cited by examiner

*Primary Examiner*—David R Vincent
*Assistant Examiner*—Adrian L Kennedy
(74) *Attorney, Agent, or Firm*—Seth H. Ostrow; Ostrow Kaufman & Frankl LLP

(57) ABSTRACT

A computerized system and method for large scale semi-supervised learning is provided. The training set comprises a mix of labeled and unlabeled examples. Linear classifiers based on support vector machine principles are built using these examples. One embodiment uses a fast design of a linear transductive support vector machine using multiple switching. In another embodiment, mean field annealing is used to form a very effective semi-supervised support vector machine. For both these embodiments the finite Newton method is used as the base method for achieving fast training.

20 Claims, 13 Drawing Sheets

| | |
|---|---|
| Problem | Given $l$ labeled examples $\{x_i, y_i\}_{i=1}^{l}$ where $x_i \in \mathbb{R}^d, y_i \in \{-1, +1\}$ and a cost for each example $\{c_i\}_{i=1}^{l}$, Solve: $$\beta^* = \underset{\beta \in \mathbb{R}^d}{\text{argmin}} \quad \frac{1}{2} \sum_{i=1}^{l} c_i \left[ y_i - \beta^T x_i \right]^2 + \frac{\lambda}{2} \|\beta\|^2$$ Equivalently Solve: $\left[ \lambda I + X^T C X \right] \beta^* = X^T C Y$ |
| Define | $X = [x_1 \ldots x_l]^T \in \mathbb{R}^{l \times d}$, $Y = [y_1 \ldots y_l]^T \in \mathbb{R}^{l \times 1}$<br>$C \in \mathbb{R}^{l \times l}$ : a diagonal matrix with $C_{ii} = c_i$<br>$\beta \in \mathbb{R}^d$: a guess for the solution (set $\beta = 0 \in \mathbb{R}^d$ if unavailable)<br>$o = X\beta$ |
| Inputs | $X, Y, C, \lambda, \beta, o, \epsilon,$ cgitermax |
| Initialization | $z = C(Y - o) \quad r = X^T z - \lambda \beta \quad p = r \quad \omega_1 = \|r\|^2$<br>cgiter = 0     optimality = 0 |
| Iterate | while (cgiter < cgitermax)<br>    cgiter = cgiter + 1<br>    $q = Xp$<br>    $\gamma = \frac{\omega_1}{\lambda \|p\|^2 + q^T C q}$<br>    $\beta = \beta + \gamma p$<br>    $o = o + \gamma q$<br>    $z = z - \gamma C q$<br>    $\omega_2 = \omega_1$<br>    $r = X^T z - \lambda \beta$<br>    $\omega_1 = \|r\|^2$<br>    if ($\omega_1 < \epsilon^2 \|z\|^2$)<br>        Set optimality = 1 and Exit while loop.<br>    end if<br>    $\omega = \frac{\omega_1}{\omega_2}$<br>    $p = r + \omega p$<br>end while |
| Outputs | $\beta, o,$ optimality |

Fig. 4

| | |
|---|---|
| Inputs | $w, \tilde{w}, o, \bar{o}, Y, C$ as defined in Table 1 |
| Initialize | $\jmath = \{i : y_i o_i < 1\}$ <br> $L = \lambda w^T(\tilde{w} - w) + \sum_{i \in \jmath} C_{ii}(o_i - y_i)(\bar{o}_i - o_i)$ <br> $R = \lambda \tilde{w}^T(\tilde{w} - w) + \sum_{i \in \jmath} C_{ii}(\bar{o}_i - y_i)(\bar{o}_i - o_i)$ <br> Define $\delta_i = \frac{(y_i - o_i)}{\bar{o}_i - o_i}$ for all $i$ <br> $\Delta_1 = \{\delta_i : i \in \jmath, \ y_i(\bar{o}_i - o_i) > 0\}$ <br> $\Delta_2 = \{\delta_i : i \notin \jmath, \ y_i(\bar{o}_i - o_i) < 0\}$ <br> $\Delta = \Delta_1 \cup \Delta_2$ <br> $j = 0$ <br> Reorder indices so that $\delta_i \in \Delta$ are sorted in non-decreasing order $\delta_{i_1}, \delta_{i_2} \ldots$ |
| Iterate | for $j = 1, 2 \ldots$ <br> $\quad \delta' = L + \delta_{i_j}(R - L)$ <br><br> $\quad$ if $(\delta' \geq 0)$ <br> $\quad\quad$ *Exit for loop* <br> $\quad$ end if <br><br> $\quad$ Set $s = -1$ if $\delta_{i_j} \in \Delta_1$ or $s = 1$ if $\delta_{i_j} \in \Delta_2$ <br> $\quad L = L + s C_{i_j i_j}(o_{i_j} - y_{i_j})(\bar{o}_{i_j} - o_{i_j})$ <br> $\quad R = R + s C_{i_j i_j}(\bar{o}_{i_j} - y_{i_j})(\bar{o}_{i_j} - o_{i_j})$ <br> end for |
| Output | $\delta^* = \frac{-L}{R - L}$ |

Fig. 5

| | |
|---|---|
| Problem | Given $l$ labeled examples $\{x_i, y_i\}_{i=1}^{l}$ where $x_i \in \mathbb{R}^d, y_i \in \{-1, +1\}$ and a cost for each example $\{c_i\}_{i=1}^{l}$, Solve: $$w^* = \underset{w \in \mathbb{R}^d}{\mathrm{argmin}} \ \frac{1}{2} \sum_{i=1}^{l} c_i \max\left[0, 1 - y_i (w^T x_i)\right]^2 + \frac{\lambda}{2} \|w\|^2$$ |
| Define | $X = [x_1 \ldots x_l]^T \in \mathbb{R}^{l \times d}, \quad Y = [y_1 \ldots y_l]^T \in \mathbb{R}^{l \times 1}$<br>$C \in \mathbb{R}^{l \times l}$ : a diagonal matrix with $C_{ii} = c_i$<br>$w \in \mathbb{R}^d$: (a guess for the solution)<br>If a guess is available, it is also convenient to pass:<br>$o = Xw \quad \jmath = \{i : y_i o_i < 1\} \quad \jmath^c = \{i : i \in \jmath\}$ |
| Inputs | $X, Y, C, \lambda$ and $w, o, \jmath, \jmath^c$ (if available) |
| Initialize | if $w, o$ unavailable (or set as zero vectors) set $w = 0 \in \mathbb{R}^d$, $o = 0 \in \mathbb{R}^l$, $\epsilon = 10^{-2}$, cgitermax = 10, $\jmath = 1 \ldots l$, $\jmath^c = \phi$<br>if $w, o, \jmath, \jmath^c$ are available, set $\epsilon = 10^{-6}$, cgitermax = 10000<br><br>$\tau = 10^{-8} \quad \text{iter} = 0 \quad \text{itermax} = 50$ |
| Iterate | while (iter < itermax)<br>   iter=iter+1<br><br>   $(\bar{w}, \bar{o}_\jmath, \text{opt}) = \text{CGLS}(X_\jmath, Y_\jmath, C_\jmath, w, o_\jmath, \epsilon, \text{cgitermax})$    (see table 2)<br>   $\bar{o}_{\jmath^c} = X_{\jmath^c} \bar{w}$<br>   If cgitermax=10 reset cgitermax = 10000<br>   if   $(\text{opt} = 1, \forall \, i \in \jmath \ \ y_i \bar{o}_i \leq 1 + \tau \ , \ \forall \, i \in \jmath^c \ \ y_i \bar{o}_i \geq 1 - \tau)$<br>      If $\epsilon = 10^{-2}$ reset $\epsilon = 10^{-6}$ and<br>         continue the while loop iterations.<br>      Else set $w = \bar{w} \quad o = \bar{o}$<br>         and exit the while loop.<br>   end if<br><br>   $\delta = \text{LINE-SEARCH}(w, \bar{w}, o, \bar{o}, Y, C)$    (see table 3)<br><br>   $w = w + \delta(\bar{w} - w)$<br>   $o = o + \delta(\bar{o} - o)$<br>   $\jmath = \{i \in 1 \ldots l : y_i o_i < 1\} \quad \jmath^c = \{i \in 1 \ldots l : i \notin \jmath\}$<br>end while |
| Outputs | $w, o, \jmath, \jmath^c$ |

Fig. 6

| | |
|---|---|
| Problem | Given $l$ labeled examples $\{x_i, y_i\}_{i=1}^{l}$ where $x_i \in \mathbb{R}^d, y_i \in \{-1, +1\}$ and $u$ unlabeled examples $\{x_j'\}_{j=1}^{u}$, Solve problem in Eqn. 7. |
| Define | $X = [x_1 \ldots x_l]^T \in \mathbb{R}^{l \times d} \quad Y = [y_1 \ldots y_l]^T \in \mathbb{R}^{l \times 1}$ <br> $X' = [x_1' \ldots x_u']^T \in \mathbb{R}^{l \times u}$ <br> $o = Xw \quad o' = X'w$ |
| Inputs | $X, Y, X', \lambda, \lambda'$ <br> $r, S$ (maximum number of label pairs to switch, default S=1) |
| Initialization | $C \in \mathbb{R}^{l \times l}$ : a diagonal matrix with $C_{ii} = \frac{1}{l}$ <br> $w_0 = $ L$_2$-SVM-MFN$(X, Y, C)$ <br> Compute $o' = X'w_0$. Assign positive and negative labels to the unlabeled data in the ratio $r : (1 - r)$ respectively by thresholding $o'$. Put these labels in a vector $Y'$. <br> Set $\hat{\lambda}' = 10^{-5}$   Define: $\hat{X} = \begin{pmatrix} X \\ X' \end{pmatrix} \quad \hat{Y} = \begin{pmatrix} Y \\ Y' \end{pmatrix}$ <br> Define $\hat{C} \in \mathbb{R}^{(l+u) \times (l+u)}$ : a diagonal matrix with: <br> $\hat{C}_{ii} = \frac{1}{l} \ (1 \leq i \leq l) \quad \hat{C}_{ii} = \frac{\hat{\lambda}'}{u} \ (l+1 \leq i \leq l+u)$ <br> Set $w = 0 \in \mathbb{R}^d \quad o = 0 \in \mathbb{R}^l \quad o' \in \mathbb{R}^u \quad j = 1 \ldots (l+u) \quad j^c = \phi$ |
| Iterate (Loop 1) <br> Re-training 1 <br> Iterate (Loop 2) <br><br> Switch Labels <br><br><br> Re-training 2 <br><br> Increase $\hat{\lambda}'$ | while $\hat{\lambda}' < \lambda'$ <br> $\quad (w, [o \ o'], j, j^c) = $ L$_2$-SVM-MFN$(\hat{X}, \hat{Y}, \hat{C}, w, [o \ o'], j, j^c)$ <br> $\quad$ while ($\exists \ s$ index pairs $(i_k, j_k)_{k=1}^{s} : 1 \leq i_k, j_k \leq u$ with $s \leq S$ <br> $\quad\quad$ such that: $Y'_{i_k} = +1, \ Y'_{j_k} = -1, \ o'_{i_k} < 1, \ -o'_{j_k} < 1, \ o'_{i_k} < o'_{j_k}$) <br> $\quad\quad Y'_{i_k} = -1 \quad Y'_{j_k} = +1 \quad$ for $k = 1, 2 \ldots s$ <br> $\quad\quad \hat{Y} = \begin{pmatrix} Y \\ Y' \end{pmatrix}$ <br> $\quad\quad (w, [o \ o'], j, j^c) = $ L$_2$-SVM-MFN$(\hat{X}, \hat{Y}, \hat{C}, w, [o \ o'], j, j^c)$ <br> $\quad$ end while (loop 2) <br> $\quad \hat{\lambda}' = 2\hat{\lambda}'$ <br> $\quad \hat{C}_{ii} = \frac{1}{l} \ (1 \leq i \leq l) \quad \hat{C}_{ii} = \frac{\hat{\lambda}'}{u} \ (l+1 \leq i \leq l+u)$ <br> end while (loop 1) |
| Output | $w$ |

Fig. 8

| | |
|---|---|
| Inputs | $X, Y, p, \lambda, \lambda'$ and $w, [o\ o'], \jmath_l, \jmath_1, \jmath_2$ (if available) |
| Initialize | if $w$ unavailable (or set as zero vectors) set $w = 0 \in \mathbb{R}^d$, $[o\ o'] = 0 \in \mathbb{R}^{l+u}$, $\epsilon = 10^{-2}$, cgitermax = 10, $\jmath_l = 1\ldots l$, $\jmath_2 = 1\ldots u$, $\jmath_l = \jmath_l^c = \phi$ |
| | if $w, [o\ o'], \jmath_l, \jmath_1, \jmath_2$ are available, set $\epsilon = 10^{-6}$, cgitermax = 10000, $\jmath_l^c = \{i \in 1\ldots l : i \notin \jmath_l\}$ |
| | $\tau = 10^{-8}$   iter = 0   itermax = 50 |
| | Set $\hat{Y}, C$ according to Eqn. 11 |
| | Set $\tilde{Y}, \tilde{C}$ according to Eqn. 14 |
| Iterate | while (iter < itermax) |
| |    iter=iter+1 |
| |    Define the active index set: $\jmath = \jmath_l \bigcup \{j\}_{j=l+1}^{l+u}$ |
| |    $(\bar{w}, [\bar{o}_{\jmath_l}\ \bar{o}'], \text{opt}) = \text{CGLS}\left(X_\jmath, \tilde{Y}_\jmath, C_\jmath, w, [o_{\jmath_l}\ o'], \epsilon, \text{cgitermax}\right)$ |
| |    $\bar{o}_{\jmath_l^c} = X_{\jmath_l^c} \bar{w}$ |
| |    if cgitermax=10 reset cgitermax = 10000 |
| |    if opt = 1,   $\forall i \in \jmath_l\ y_i \bar{o}_i \leq 1 + \tau$,   $\forall i \in \jmath_l^c\ y_i \bar{o}_i \geq 1 - \tau$ |
| |    $\forall j \in \jmath_1\ \|\bar{o}'_j\| >= 1 - \tau\ \forall j \in \jmath_2\ \|\bar{o}'_j\| < 1 + \tau$ |
| |      If $\epsilon = 10^{-2}$ reset $\epsilon = 10^{-6}$ and |
| |        continue the while loop iterations. |
| |      Else set $w = \bar{w}\quad o = \bar{o}$ |
| |        and exit the while loop. |
| | end if |
| |    $\delta = \text{LINE-SEARCH}(w, \bar{w}, [o\ o'\ o'], [\bar{o}\ \bar{o}'\ \bar{o}'], Y_{all}, C_{all})$ |
| |    $w = w + \delta(\bar{w} - w)$ |
| |    $o = o + \delta(\bar{o} - o)\quad o' = o' + \delta(\bar{o}' - o')$ |
| |    $\jmath = \{i : y_i o_i < 1\}\quad \jmath_l^c = \{i : i \notin \jmath_l\}$ |
| |    $\jmath_1 = \{j \in 1\ldots u : \|o'_j\| >= 1\}\quad \jmath_2 = \{j \in 1\ldots u : \|o'_j\| < 1\}$ |
| |    Recompute $\tilde{Y}, \tilde{C}$ according to Eqn. 14 |
| | end while |
| Output | $w, [o\ o'], \jmath_l, \jmath_1, \jmath_2$ |

Fig. 10

| | |
|---|---|
| Inputs | $o', \lambda', T, r$ |
| Initialize | Compute $g = [g_1 \ldots g_u]$<br>where $g_j = \lambda' \left( \max\left[0, 1 - o'_j\right]^2 - \max\left[0, 1 + o'_j\right]^2 \right)$<br>$\epsilon = 10^{-10}$     iter = 0     maxiter = 500<br>$\nu_- = \min(g_1 \ldots g_u) - T \log \frac{1-r}{r}$<br>$\nu_+ = \max(g_1 \ldots g_u) - T \log \frac{1-r}{r}$<br>$\nu = (\nu_+ + \nu_-)/2$     Initial guess<br>$s = [e^{-\frac{(g_1-\nu)}{T}} \ldots \ldots e^{-\frac{(g_u-\nu)}{T}}]$<br>$B(\nu) = \frac{1}{u} \sum_{i=1}^{u} \frac{1}{1+s_i} - r$<br>$B'(\nu) = \frac{1}{Tu} \sum_{i=1}^{u} \frac{s_i}{(1+s_i)^2}$   (if $s_i \to \infty$, i.e larger than some upper limit, set corresponding term to 0) |
| Iterate | while $(|B(\nu)| > \epsilon)$ AND (iter < maxiter)<br>    iter=iter+1<br>    if $|B'(\nu)| > 0$<br>        $\hat{\nu} = \nu - \frac{B(\nu)}{B'(\nu)}$<br>    end if<br>    if $(\hat{\nu} < \nu_-)$ OR $(\hat{\nu} > \nu_+)$ OR $B'(\nu) = 0$ |
| Bisection |         $\nu = \frac{\nu_- + \nu_+}{2}$<br>    else |
| Newton-Raphson |         $\nu = \hat{\nu}$<br>    end if |
| Update |     $s = [e^{-\frac{(g_1-\nu)}{T}} \ldots \ldots e^{-\frac{(g_u-\nu)}{T}}]$<br>    $B(\nu) = \frac{1}{u} \sum_{i=1}^{u} \frac{1}{1+s_i} - r$<br>    $B'(\nu) = \frac{1}{Tu} \sum_{i=1}^{u} \frac{s_i}{(1+s_i)^2}$   (if $s_i \to \infty$, i.e larger than some upper limit, set corresponding term to 0)<br>    if $B(\nu) < 0$ set $\nu_- = \nu$ else $\nu_+ = \nu$<br>    if $|\nu_+ - \nu_-| < \epsilon$ exit while loop<br>end while |
| Output | $p = [\frac{1}{1+s_1} \ldots \frac{1}{1+s_u}]$ |

Fig. 12

| | |
|---|---|
| Problem | Given $l$ labeled examples $\{x_i, y_i\}_{i=1}^{l}$ where $x_i \in \mathbb{R}^d, y_i \in \{-1, +1\}$ and $u$ unlabeled examples $\{x'_j\}_{j=1}^{u}$, Solve for $w^*$ in Eqns 10,8,9. |
| Define | $X = [x_1 \ldots x_l]^T \in \mathbb{R}^{l \times d} \quad Y = [y_1 \ldots y_l]^T \in \mathbb{R}^{l \times 1}$ <br> $X' = [x'_1 \ldots x'_u]^T \in \mathbb{R}^{l \times u}$ |
| Inputs | $X, Y, X', \lambda, \lambda', r$ |
| Initialization | $T = 10 \quad R = 1.5 \quad \epsilon = 10^{-5}$ <br> iter1=0  itermax1 = 30  itermax = 100 <br> $\tilde{X} = [X^T \ X'^T]$ <br> $p = [r \ldots r]^T \in \mathbb{R}^u$ <br> $h = H(p)$ (Eqn. 16) <br><br> $(w, [o \ o'], \jmath_l, \jmath_1, \jmath_2) = \text{OPTIMIZE-W}(X, Y, p, \lambda, \lambda')$ (Table 7) <br> $F = J(w)$ (Eqn. 18) <br> $F_{\min} = F \quad w_{\min} = w \quad o'_{\min} = o'$ |
| Loop 1 | while (iter1 < itermax1) AND ($h > \epsilon$) <br>     iter1 = iter1 + 1  iter2 = 0 <br>     kl=1 |
| Loop 2 |     while (iter2 < itermax2) AND (kl > $\epsilon$) <br>         iter2 = iter2 +1 <br>         $q = p$ <br><br>         $p = \text{OPTIMIZE-P}(o', \lambda', T, r)$ (Table 6) <br>         $(w, [o \ o'], \jmath_l, \jmath_1, \jmath_2) =$ <br>             $\text{OPTIMIZE-W}(X, Y, p, \lambda, \lambda', w, [o \ o'], \jmath_l, \jmath_1, \jmath_2)$ (Table 7) <br><br>         kl = $KL(p, q)$ (Eqn. 16) <br>         $F = J(w)$ (Eqn. 18) <br>         if $F < F_{\min}$ <br>             $F_{\min} = F \quad w_{\min} = w \quad o'_{\min} = o'$ <br>         end if <br>     end while (loop 2) <br>     $h = H(p)$ <br>     $T = T/R$ <br> end while (loop 1) |
| Output | $w_{\min}$ |

Fig. 13

LARGE SCALE SEMI-SUPERVISED LINEAR SUPPORT VECTOR MACHINES

FIELD OF THE INVENTION

The invention is a method for large scale semi-supervised linear support vector machines. Specifically, the invention provides a system and method that uses a modified finite Newton method for fast training of linear SVMs using a mix of labeled and unlabeled examples.

BACKGROUND OF THE INVENTION

Many problems in information processing involve the selection or classification of items in a large data set. For example, web-based companies such as Yahoo! have to frequently classify web pages as belonging to one group or the other, e.g., as commercial or non-commercial.

Currently, large amounts of data can be cheaply and automatically collected. However, labeling of the data typically involves expensive and fallible human participation. For example, a single web-crawl by a search engine, such as Yahoo or Google, indexes billions of webpages. Only a very small fraction of these web-pages can be hand-labeled by human editorial teams and assembled into topic directories. The remaining web-pages form a massive collection of unlabeled documents.

The modified finite Newton algorithm, described in co-pending application Ser. No. 10/949,821, entitled "A Method And Apparatus For Efficient Training Of Support Vector Machines," filed Sep. 24, 2004, the entirety of which is incorporated herein by reference, describes a method for training linear support vector machines (SVMs) on sparse datasets with a potentially very large number of examples and features. Such datasets are generated frequently in domains like document classification. However, the system and method described in that application incorporates only labeled data in a finite Newton algorithm (abbreviated L2-SVM-MFN). Large scale learning is often realistic only in a semi-supervised setting where a small set of labeled examples is available together with a large collection of unlabeled data.

A system and method that provides for extension of linear SVMs for semi-supervised classification problems involving large, and possibly very high-dimensional but sparse, partially labeled datasets is desirable. In many information retrieval and data mining applications, linear methods are strongly preferred because of their ease of implementation, interpretability and empirical performance. The preferred embodiments of the system and method described herein clearly address this and other needs.

BRIEF SUMMARY OF THE INVENTION

In one preferred embodiment, a transductive support vector machine (TSVM) system and method for linear semi-supervised classification on large, sparse datasets is provided. The system and method exploits data sparsity and linearity to provide superior scalability. According to another preferred embodiment, a multiple switching heuristic further improves TSVM training significantly for large scale applications.

In another preferred embodiment, a system and method for semi-supervised SVMs is disclosed that uses global optimization using mean field methods. The method generates a family of objective functions with non-convexity that is controlled by an annealing parameter. The global minimizer is tracked with respect to this parameter. This method alleviates the problem of local minima in the TSVM optimization procedure that results in significantly better operation in many applications, while being computationally judicious.

According to another preferred embodiment, a computerized system and method for semi-supervised learning is provided. A training set example elements is received. Elements of the training set that are determined to fall within a classification group are labeled. The training set thereby has labeled elements and unlabelled elements. The system uses selected labeled elements and unlabeled elements as examples in a large scale semi-supervised support vector machine to select a linear classifier. The system receives unclassified data items. Using the selected linear classifier, the received unclassified data elements are classified.

BRIEF DESCRIPTION OF THE DRAWINGS

FIG. 4 is a table listing conjugate gradient scheme iterations according to one embodiment;

FIG. 5 is a table outlining a full line search routine method performed by one embodiment;

FIG. 6 is a table having an abridged pseudo-code listing for a method performed by one embodiment;

FIG. 8 is a table outlining a transductive SVM algorithm performed by one embodiment;

FIG. 10 is a table illustrating steps for optimizing a weight vector w according to one embodiment;

FIG. 12 is table illustrating steps for optimizing a belief probability p according to one embodiment; and FIG. 13 is table illustrating steps for a method of mean field annealing according to one embodiment.

DETAILED DESCRIPTION OF THE PREFERRED EMBODIMENTS

A preferred embodiment of a large scale semi-supervised linear support vector machine, constructed in accordance with the claimed invention, is directed towards a modified finite Newton method for fast training of linear SVMs. According to one embodiment, the system uses two efficient and scalable methods for training semi-supervised SVMs. The first method provides a fast implementation of a variant of linear a transductive SVM (TSVM). The second method is based on a mean field annealing (MFA) approach, designed to alleviate the problem of local minimum in the TSVM optimization procedure.

Figure 1:
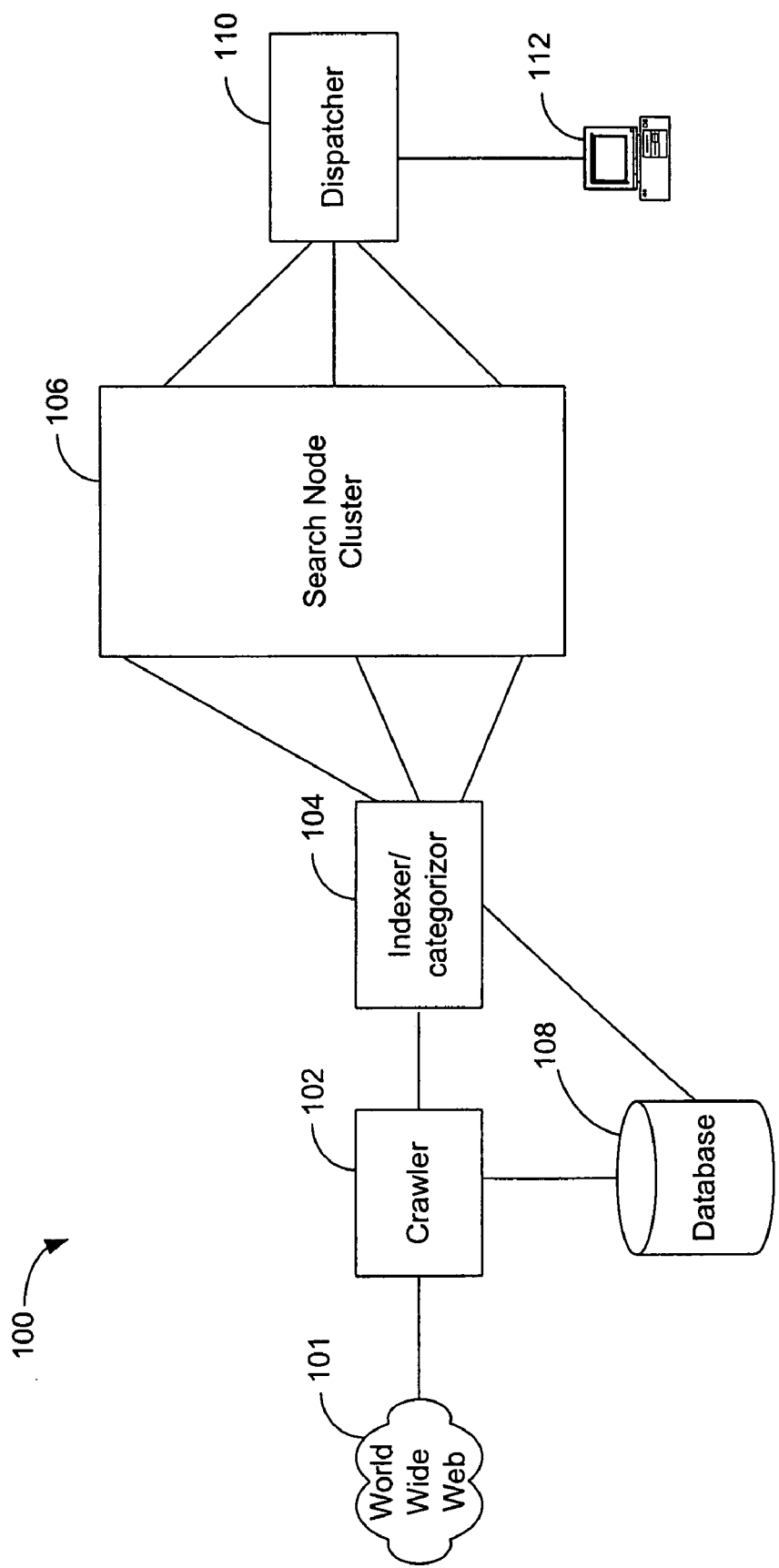
FIG. 1 is a block diagram illustrating components of a search engine in which one embodiment operates.

In one embodiment, as an example, and not by way of limitation, an improvement in Internet search engine labeling of web pages is provided. The World Wide Web is a distributed database comprising billions of data records accessible through the Internet. Search engines are commonly used to search the information available on computer networks, such as the World Wide Web, to enable users to locate data records of interest. A search engine system 100 is shown in FIG. 1. Web pages, hypertext documents, and other data records from a source 101, accessible via the Internet or other network, are collected by a crawler 102. The crawler 102 collects data records from the source 101. For example, in one embodiment, the crawler 102 follows hyperlinks in a collected hypertext document to collect other data records. The data records retrieved by crawler 102 are stored in a database 108. Thereafter, these data records are indexed by an indexer 104. Indexer 104 builds a searchable index of the documents in database 108. Common prior art methods for indexing may include inverted files, vector spaces, suffix structures, and hybrids thereof. For example, each web page may be broken down into words and respective locations of each word on the page. The pages are then indexed by the words and their respective locations. A primary index of the whole database 108 is then broken down into a plurality of sub-indices and each sub-index is sent to a search node in a search node cluster 106.

To use search engine 100, a user 112 typically enters one or more search terms or keywords, which are sent to a dispatcher 110. Dispatcher 110 compiles a list of search nodes in cluster 106 to execute the query and forwards the query to those selected search nodes. The search nodes in search node cluster 106 search respective parts of the primary index produced by indexer 104 and return sorted search results along with a document identifier and a score to dispatcher 110. Dispatcher 110 merges the received results to produce a final result set displayed to user 112 sorted by relevance scores.

As a part of the indexing process, or for other reasons, most search engine companies have a frequent need to classify web pages as belonging to one "group" or another. For example, a search engine company may find it useful to determine if a web page is of a commercial nature (selling products or services), or not. As another example, it may be helpful to determine if a web page contains a news article about finance or another subject, or whether a web page is spam related or not. Such web page classification problems are binary classification problems (x versus not x). To develop a classifier that can do such distinguishing usually takes a large sample of web pages labeled by editorial teams and for use as a training set for designing a classifier.

Figure 2:
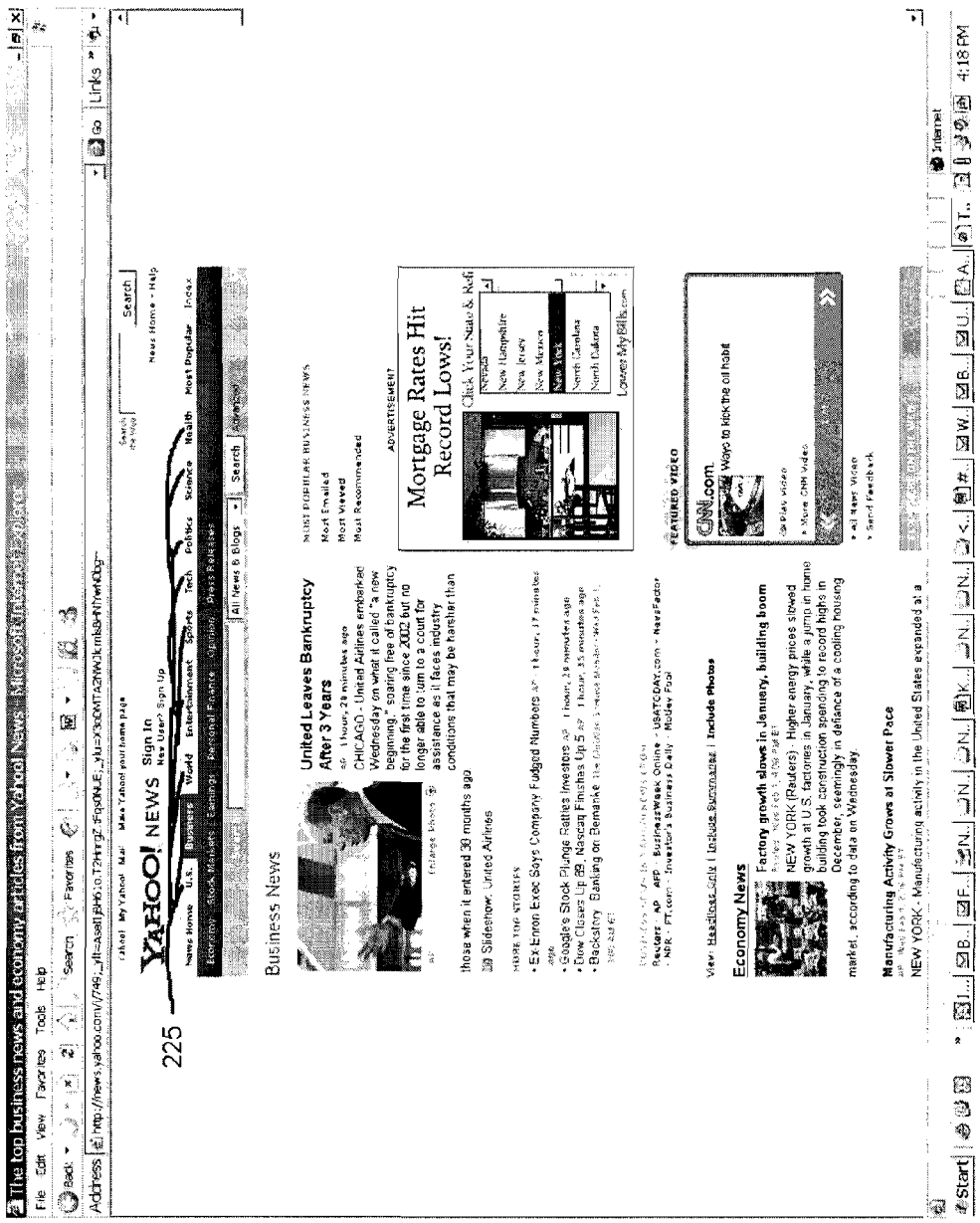
FIG. 2 is an example of a news web page that can be categorized using one embodiment.

Referring to FIG. 2, there is shown an example of a web page that has been categorized. In this example, the web page is categorized as a "Business" related web page, as indicated by the topic indicator 225 at the top of the page. Other category indicators 225 are shown. Thus, if a user had searched for business categorized web pages, then the web page of FIG. 2 would be listed, having been categorized as such.

Figure 3:
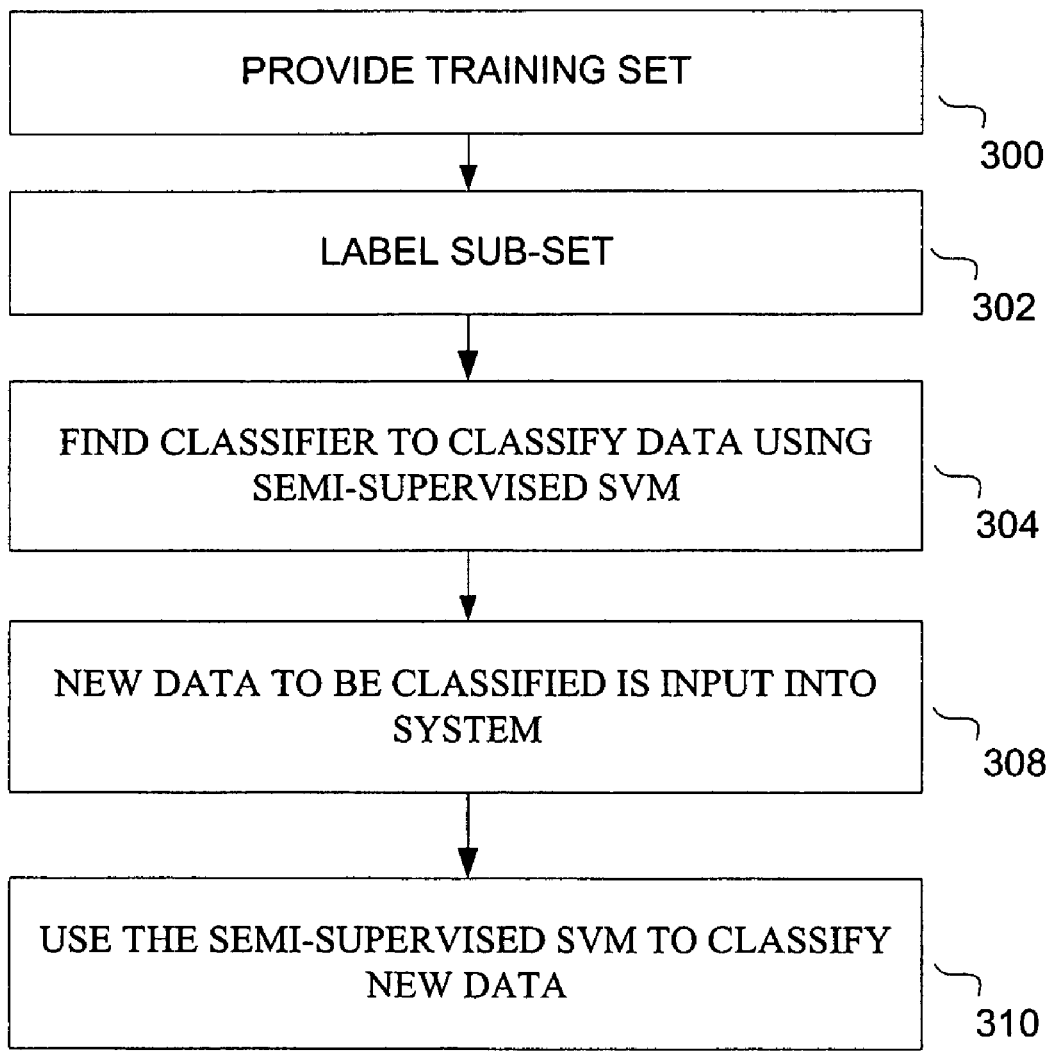
FIG. 3 is a flow diagram illustrating steps performed by the system according to one embodiment associated with search engine relevance ranking.

With reference to FIG. 3, a flow diagram illustrates the steps performed according to one embodiment. In step 300, a training set of documents is provided. In one embodiment, this training set includes randomly selected unlabelled web pages. In step 302, a sub-set of the training set is labeled as meeting the criteria for inclusion in or exclusion from a group (classification group). For example, the group may include sports web pages in the case of the Internet web-page example discussed above. This step may involve, by way of example, and not by way of limitation, human review of sample web pages for labeling of web pages that are determined to fall within the group (for example, sports web pages) and also possibly labeling some pages as outside the group (for example, non-sports pages), in the labeled training set. Unlike previous systems and methods, it is not strictly necessary to label examples of data that does not fall within the criteria (for example, non-sports pages). In one embodiment, non-labeled examples (e.g. unlabelled sports and non-sports pages) can be used by the system, but it is not necessary. Once the sub-set is labeled, the whole training set of labeled and unlabelled data is available to the system.

In step 304, a modified finite Newton method for fast training of large scale semi-supervised linear SVMs is used to find a classifier. Even though the labeled training set can be any set of examples from within and outside the group, it is preferable for the method to retain knowledge of the fraction of the group in the entire distribution. For example, in the case of the group consisting of sports web pages, if this group forms 1% of the entire collection of web pages, then this number is preferably conveyed as an input to the method as compared to unlabeled examples. In the description of the method below, this number, written as a fraction (for example, 0.01) is called r.

In Step 308, new data, such as a web-page of a document to be classified is input into the system. In Step 310, the semi-supervised SVM obtained in Step 304 is used to classify new data.

A modified version of $L_2$-SVM-MFN algorithm is now discussed to suit the description of two semi-supervised extensions discussed thereafter. The first extension provides an efficient implementation of a variant of Linear Transductive SVM (TSVM). The second extension is based on a mean field annealing (MFA) algorithm designed to track the global optimum of the TSVM objective function.

Modified Finite Newton Linear $L_2$-SVM

The modified finite Newton $L_2$-SVM method ($L_2$-SVM-MFN) for Linear SVMs is ideally suited to sparse datasets with large number of examples and possibly large number of features. In a typical application, such as document classification, many training documents are collected and processed into a format that is convenient for mathematical manipulations. For example, each document may be represented as a collection of d features associated with a vocabulary of d words. These features may simply indicate the presence or absence of a word (binary features), or measure the frequency of a word suitably normalized by its importance (term frequency inverse document frequency (TFIDF) features). Even though the vocabulary might be large, only a very small number of words appear in any document relative to the vocabulary size. Thus, each document is sparsely represented as a bag of words. A label is then manually assigned to each document identifying a particular category to which it belongs (e.g. "commercial" or not). The task of a classification algorithm (e.g. SVM) is to produce a classifier that can reliably identify the category of new documents based on training documents.

Given a binary classification problem with 1 labeled examples $\{x_i, y_i\}_{i=1}^l$ where the input patterns $x_i \in R^d$ (e.g. a document) and the labels $y_i \in \{+1, -1\}$, $L_2$-SVM-MFN provides an efficient primal solution to the following SVM optimization problem:

$$w^* = \underset{w \in R^d}{\operatorname{argmin}} \; \frac{1}{2} \sum_{i=1}^{l} \max[0, 1 - y_i(w^T x_i)]^2 + \frac{\lambda}{2} \|w\|^2 \qquad (1)$$

Here, $\lambda$ is a real-valued regularization parameter and sign $(w^{*T}x)$ is the final classifier.

This objective function differs from the standard SVM problem in some respects. First, instead of using the hinge loss as the data fitting term, the square of the hinge loss (or the so-called quadratic soft margin loss function) is used. This makes the objective function continuously differentiable, allowing easier applicability of gradient techniques. Secondly, the bias term ("b") is also regularized. In the problem formulation of equation 1, it is assumed that an additional component in the weight vector and a constant feature in the example vectors have been added to indirectly incorporate the bias. This formulation combines the simplicity of a least squares aspect with algorithmic advantages associated with SVMs. It should also be noted that the methods discussed herein can be applied to other loss functions.

In one embodiment, a version of L2-SVM-MFN where a weighted quadratic soft margin loss function is used.

$$w^* = \underset{w \in \mathbf{R}^d}{\arg\min} f(w) = \underset{w \in \mathbf{R}^d}{\arg\min} \frac{1}{2} \sum_{i \in j(w)} c_i d_i^2(w) + \frac{\lambda}{2} \|w\|^2 \qquad (2)$$

In equation 2, equation 1 is re-written in terms of a partial summation of $d_i(w) = w^T x_i - y_i$ over an index set $j(w) = \{i : y_i (w^T x_i) < 1\}$. Additionally, the loss associated with the $i^{th}$ example has a cost $c_i$. $f(w)$ refers to the objective function being minimized, evaluated at a candidate solution w. It is noted that if the index set $j(w)$ were independent of w and ran over all data points, this would simply be the objective function for weighted linear regularized least squares (RLS).

In one embodiment, f is a strictly convex, piecewise quadratic, continuously differentiable function having a unique minimizer. The gradient of f at w is given by:

$$\nabla f(w) = \lambda w + \sum_{i \in j(w)} c_i d_i(w) x_i = \lambda w + X_{j(w)}^T C_{j(w)} [X_{j(w)} w - Y_{j(w)}]$$

where $X_{j(w)}$ is a matrix whose rows are the feature vectors of training points corresponding to the index set $j(w)$, $Y_{j(w)}$ is a column vector containing labels for these points, and $C_{j(w)}$ is a diagonal matrix that contains the costs $c_i$ for these points along its diagonal.

In one embodiment, $L_2$-SVM-MFN is a primal algorithm that uses the Newton's method for unconstrained minimization of a convex function. The classical Newton's method is based on a second order approximation of the objective function, and involves updates of the following kind:

$$w^{(k+1)} = w^{(k)} + \delta^{(k)} n^{(k)} \qquad (3)$$

where the step size $\delta^k \in \mathbf{R}$, and the Newton direction $n^k \in \mathbf{R}^d$ is given by:

$$n^{(k)} = -[\nabla^2 f(w^{(k)})]^{-1} \nabla f(w^{(k)})$$

$\nabla f(w^{(k)})$ is the gradient vector and $\nabla^2 f(w^{(k)})$ is the Hessian matrix of f at $w^{(k)}$. However, the Hessian does not exist everywhere, since f is not twice differentiable at those weight vectors w where $w^T x_i = y_i$ for some index i. For this reason, a finite Newton method works around this issue through a generalized definition of the Hessian matrix. The modified finite Newton procedure proceeds as follows. The step $\overline{w}^{(k)} = w^{(k)} + n^{(k)}$ in the Newton direction can be seen to be given by solving the following linear system associated with a weighted linear regularized least squares problem over the data subset defined by the indices $j(w^{(k)})$:

$$[\lambda I + X_{j(w^{(k)})}^T C_{j(w^{(k)})} X_{j(w^{(k)})}] \overline{w}^{(k)} = X_{j(w^{(k)})}^T C_{j(w^{(k)})} Y_{j(w^{(k)})} \qquad (4)$$

where I is the identity matrix. Once $\overline{w}^{(k)}$ is obtained, $w^{(k+1)}$ is obtained from equation 3 by setting $w^{(k+1)} = w^{(k)} + \delta^k (\overline{w}^{(k)} - w^{(k)})$ after performing an exact line search for $\delta^k$, i.e. by exactly solving a one-dimensional minimization problem:

$$\delta^{(k)} = \underset{\delta \geq 0}{\arg\min} f(w^{(k)} + \delta(\overline{w}^{(k)} - w^{(k)}))$$

The modified finite Newton procedure has the property of finite convergence to the optimal solution. The key features that bring scalability and numerical robustness to $L_2$-SVM-MFN are: (a) Solving the regularized least squares system of equation 4 by a numerically well-behaved conjugate gradient scheme referred to as conjugate gradient for least squares method (CGLS), which is designed for large, sparse data matrices X. (b) Due to the one-sided nature of margin loss functions, these systems are solved over restricted index sets $j(w)$, which can be much smaller than the whole dataset. This also allows additional heuristics to be developed such as terminating CGLS early when working with a crude starting guess, such as 0, and allowing the line search step to yield a point where the index set $j(w)$ is small. Subsequent optimization steps then work on smaller subsets of the data.

CGLS

The CGLS procedure solves large, sparse, weighted regularized least squares problems of the following form:

$$[\lambda I + X^T C X] \beta = X^T C Y \qquad (5)$$

The key computational issue in equation 5 is to avoid the construction of the large and dense matrix $X^T C X$, and work only with the sparse matrix X and the diagonal cost matrix (stored as a vector) C.

Starting with a guess solution, $\beta_0$, Conjugate Gradient performs iterations of the form:

$$\beta^{(j+1)} = \beta^{(j)} + \gamma^{(j)} p^{(j)}$$

where $p^{(j)}$ is a search direction and $\gamma^{(j)} \in \mathbf{R}$ gives the step in that direction. The residual vector (the difference vector between LHS and RHS of equation 5 for a candidate $\beta$, which is also the gradient of the associated quadratic form evaluated at $\beta$) is therefore updated as:

$$r^{(j+1)} = X^T C Y - [\lambda I + X^T C X] \beta^{(j+1)} = X^T z^{(j+1)} - \lambda \beta^{(j+1)}$$

The following intermediate vectors are introduced:

$$z^{(j+1)} = C(Y - X\beta^{(j+1)}) = C(Y - [X\beta^{(j)} + \gamma^{(j)} X p^{(j)}])$$
$$= z^{(j)} - \gamma^{(j)} C q^{(j)}$$

where $q^{(j)} = X p^{(j)}$

The optimal choice of $\gamma^{(j)}$ is given by:

$$\gamma^{(j)} = \frac{\|r^{(j)}\|^2}{p^{(j)T}(\gamma I + X^T C X) p^{(j)}} = \frac{\|r^{(j)}\|^2}{\lambda \|p^{(j)}\|^2 + q^{(j)T} C q^{(j)}}$$

Finally, the search directions are updated as:

$$p^{(j+1)} = r^{(j+1)} + w^{(j)} p^{(j)}$$

-continued where $w^{(j)} = \frac{\|r^{(j+1)}\|^2}{\|r^{(j)}\|^2}$

The CGLS iterations are terminated when the norm of the gradient $r^{(j+1)}$ becomes small enough relative to the norm of the iterate $z^{(j+1)}$ or if the number of iterations exceed a certain maximum allowable number.

The CGLS iterations are listed in the table of FIG. 4. The data matrix X is only involved in the computations through matrix vector multiplication for computing the iterates $q^{(j)}$ and $r^{(j)}$. This forms the dominant expense in each iteration (the product with C simply scales each element of a vector). If there are no non-zero elements in the data matrix, this has $O(n_0)$ cost, where $n_0$ is the number of non-zero elements in the data matrix. As a subroutine of $L_2$-SVM-MFN, CGLS is typically called on a small subset of the full data set. The total cost of CGLS is $O(t_{cgls} n_0)$ where $t_{cgls}$ is the number of iterations, which depends on the practical rank of X and is typically found to be very small relative to the dimensions of X (number of examples and features). The memory requirements are also minimal: only five vectors need to be maintained, including the outputs over the currently active set of data points.

Finally, another feature of CGLS is worth noting. Suppose the solution β of a regularizer least squares problem is available, i.e. the linear system in equation 5 has been solved using CGLS. If there is a need to solve a perturbed linear system, it is greatly advantageous in many settings to start the CG iterations for the new system with β as the initial guess. This is often called seeding. If the starting residual is small, CGLS can converge much faster than with a guess of 0 vector. The utility of this feature depends on the nature and degree of perturbation. In L2-SVM-MFN, the candidate solution $w^{(k)}$ obtained after line search in iteration k is seeded for the CGLS computation of $\overline{w}^k$ in the next iteration. Also, in tuning λ over a range of values, it is computationally valuable to seed the solution for a particular λ onto the next value. For the transductive SVM implementation with $L_2$-SVM-MFN, solutions are seeded across linear systems with slightly perturbed label vectors and data matrices.

Line Search

Given the vectors $w, \overline{w}$ in some iteration of $L_2$-SVM-MFN, the line search step includes solving:

$$\delta^* = \underset{\delta \geq 0}{\operatorname{argmin}} \phi(\delta) = f(w_\delta)$$

where $w_\delta = w + \delta(\overline{w} - w)$.

The one-dimensional function $\phi(\delta)$ is the restriction of the objective function $f$ on the ray from w onto $\overline{w}$. Hence, like $f$, $\phi(\delta)$ is also a continuously differentiable, strictly convex, piecewise quadratic function with a unique minimizer $\delta^*$ given by $\phi'(\delta^*)=0$. Thus, one needs to find the root of the piecewise linear function $$\phi'(\delta) = \lambda w_\delta^T(\overline{w} - w) + \sum_{i \in j(w_\delta)} c_i d_i(w_\delta)(\overline{o}_i - o_i) \quad (6)$$

where $o = Xw$, $\overline{o} = X\overline{w}$.

The linear pieces of $\phi'$ are defined over those intervals where $j(w_\delta)$ remains constant. Thus, the break points occur at a certain set of values $\delta_i$ where $$w_{\delta_j}^T x_i = y_i.$$

for some data point indexed by, i.e.

$$\delta_i = \frac{y_i - o_i}{\overline{o}_i - o_i} = \frac{1 - y_i o_i}{y_i(\overline{o}_i - o_i)}.$$

Among these values, only those indices i where $\delta_i \geq 0$ i.e. if $i \in j(w)$ (then $y_i o_i < 1$, so $y_i(\overline{o}_i - o_i) > 0$ or if $i \notin j(w)$ (then $y_i o_i > 1$) are considered, so $y_i(\overline{o}_i - o_i) < 0$. When δ is increased past a $\delta_{i1}$, in the former case the index i leaves j(w) and in the latter case it enters j(w). Reordering the indices so that $\delta_{j_i}$ are sorted in a non-decreasing order as $\delta_{j1}, \delta_{j2} \ldots$, the root is then easily checked in each interval $(\delta_{j_k}, \delta_{j_{k+1}})$, k=1,2 ... by keeping track of the slope of the linear piece in that interval. The slope is constant for each interval and non-decreasing as the search progresses through these ordered intervals. The interval in which the slope becomes non-negative for the first time brackets the root. Defining the extension of the linear piece in the interval $$(\delta_{j_k}, \delta_{j_{k+1}}) \text{ as } \phi_k'(\delta) = \lambda w_\delta^T(\overline{w} - w) + \sum_{i \in j(w\delta_{j_k})} c_i d_i(w_\delta)(\overline{o}_i - o_i),$$

the slope and the root computations are conveniently done by keeping track of $$L = \phi_k'(0) = \lambda w^T(\overline{w} - w) + \sum_{i \in j(w\delta_{j_k})} c_i(o_i - y_i)(\overline{o}_i - o_i) \text{ and}$$

$$R = \phi_k'(1) = \lambda \overline{w}^T(\overline{w} - w) + \sum_{i \in j(w\delta_{j_k})} c_i(\overline{o}_i - y_i)(\overline{o}_i - o_i).$$

The full line search routine is outlined in the table of FIG. 5.

The table of FIG. 6 provides an abridged pseudo-code for $L_2$-SVM-MFN. Its computational complexity therefore is $O(t_{mfn} \bar{t}_{cgls} n_0)$ where $t_{mfn}$ is the number of outer iterations of CGLS calls and line search, and $\bar{t}_{cgls}$ is the average number of CGLS iterations. These depend on the data set and the tolerance desired in the stopping criterion, but are typically very small. Therefore the complexity is found to be linear in the number of entries in the data matrix.

Semi-Supervised Linear SVMs

It is now assumed that there are l labeled examples $\{x_i, y_i\}_{i=1}^l$ and u unlabeled examples $\{x'_j\}_{j=1}^u$ with $x_i, x'_j \in R^d$ and $y_i \in \{-1, +1\}$. The goal is to construct a linear classifier sign $(w^T x)$ that utilizes unlabeled data, typically in situations where $l \ll u$. Semi-supervised algorithms provide $L_2$-SVM-MFN the capability of dealing with unlabeled data.

Transductive SVM

Transductive SVM (TSVM) appends an additional term in the SVM objective function whose role is to drive the classification hyperplane towards low data density regions. The following optimization problem is setup for standard TSVM:

$$w^* = \underset{w \in \mathbb{R}^d, \{y'_j \in \{-1,+1\}\}_{j=1}^u}{\operatorname{argmin}} \frac{\lambda}{2}\|w\|^2 +$$

$$\frac{1}{2l}\sum_{i=1}^{l}\max[0, 1 - y_i(w^T x_i)] + \frac{\lambda'}{2u}\sum_{j=1}^{u}\max[0, 1 - y'_j(w^T x'_j)]$$

$$\text{subject to:} \quad \frac{1}{u}\sum_{j=1}^{u}\max[0, \operatorname{sign}(w^T x'_j)] = r$$

The labels on the unlabeled data, $y'_1 \ldots y'_u$ are $\{+1,-1\}$-valued variables in the optimization problem. In other words, TSVM seeks a hyperplane w and a labeling of the unlabeled examples, so that the SVM objective function is minimized, subject to the constraint that a fraction r of the unlabeled data be classified positive. SVM margin maximization in the presence of unlabeled examples can be interpreted as an implementation of the cluster assumption. In the optimization problem above, $\lambda'$ is a user-provided parameter that provides control over the influence of unlabeled data. If there is enough labeled data, $\lambda, \lambda', r$ can be tuned by cross-validation. An initial estimate of r can be made from the fraction of labeled examples that belong to the positive class and subsequent fine tuning can be done based on performance on a validation set.

In one method, this optimization is implemented by first using an inductive SVM to label the unlabeled data and then iteratively switching labels and retraining SVMs to improve the objective function. The TSVM algorithm is a wrapper around an SVM training procedure. In one existing software implemented system, the training of SVMs in the inner loops of TSVM uses dual decomposition techniques. In sparse, linear settings significant speed improvements can be obtained with L2-SVM-MFN over this software system. Thus, by implementing TSVM with $L_2$-SVM-MFN, improvements are made for semi-supervised learning on large, sparse datasets. The $L_2$-SVM-MFN retraining steps in the inner loop of TSVM are typically executed extremely fast by using seeding techniques. Additionally, in one embodiment of TSVM, more than one pair of labels may be switched in each iteration.

To develop the TSVM implementation with $L_2$-SVM-MFN, the objective function is considered corresponding to equation 7 below, but with the $L_2$ loss function:

$$w^* = \underset{w \in \mathbb{R}^d, \{y'_j \in \{-1,+1\}\}_{j=1}^u}{\operatorname{argmin}} \frac{\lambda}{2}\|w\|^2 + \quad (7)$$

$$\frac{1}{2l}\sum_{i=1}^{l}\max[0, 1 - y_i(w^T x_i)]^2 + \frac{\lambda'}{2u}\sum_{j=1}^{u}\max[0, 1 - y'_j(w^T x'_j)]^2$$

$$\text{subject to:} \quad \frac{1}{u}\sum_{j=1}^{u}\max[0, \operatorname{sign}(w^T x'_j)] = r$$

Note that this objective function above can also be equivalently written in terms of the following loss over each unlabeled example x:

$$\min(\max[0,1-(w^T x)]^2, \max[0,1+(w^T x)]^2) = \max[0,1-|w^T x|]^2$$

Figure 7:
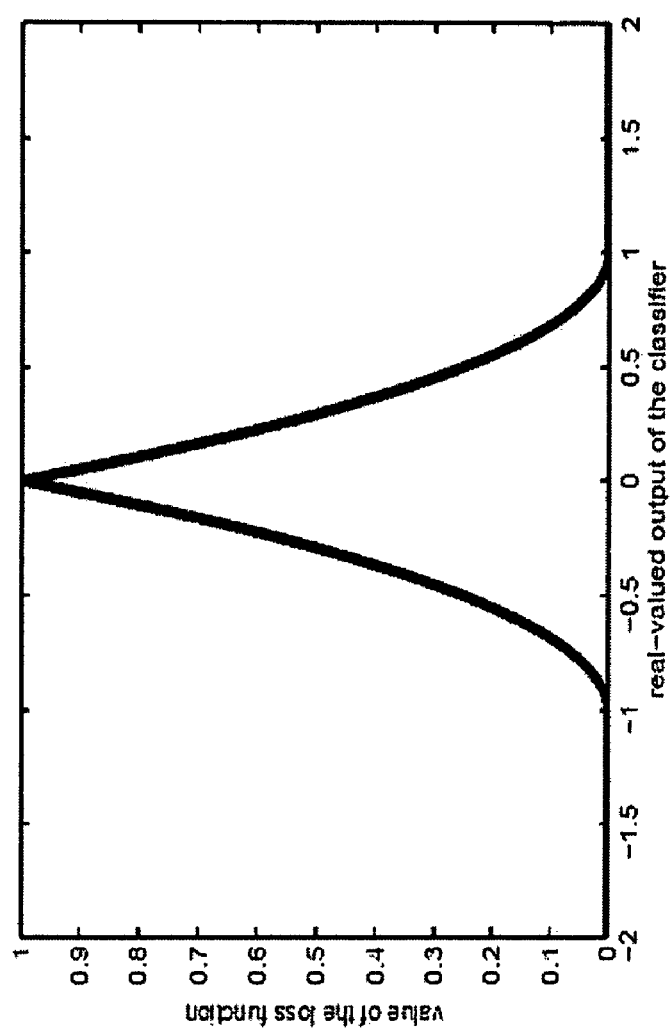
FIG. 7 is a graph illustrating an $L_2$ loss function over unlabelled examples for transductive SVM.

A value of the label variable y is selected that minimizes the loss on the unlabeled example x, and rewritten in terms of the absolute value of the output of the classifier on x. This loss function is shown in FIG. 7. It should be noted that the $L_1$ and $L_2$ loss terms over unlabeled examples are very similar on the interval $[-1,+1]$. The non-convexity of this loss function implies that the TSVM training procedure is susceptible to local optima issues. Next, a mean field annealing procedure is outlined that can overcome this problem.

The TSVM algorithm with $L_2$-SVM-MFN is outlined in the table of FIG. 8. A classifier is obtained by first running $L_2$-SVM-MFN on just the labeled examples. Temporary labels are assigned to the unlabeled data by thresholding the soft outputs of this classifier so that the fraction of the total number of unlabeled examples that are temporarily labeled positive equals the parameter r.

Then starting from a small value of $\lambda'$, the unlabeled data is gradually brought in by increasing $\lambda'$ by a factor of R where R is set to 2 in the outer loop. This gradual increase of the influence of the unlabeled data is a way to protect TSVM from being immediately trapped in a local minimum. An inner loop identifies up to S pairs of unlabeled examples with positive and negative temporary labels such that switching these labels would decrease the objective function. $L_2$-SVM-MFN is then retrained with the switched labels.

Transductive $L_2$-SVM-MFN with multiple-pair switching converges in a finite number of steps. Previous transductive support vector machine implementations used single switching (S=1) of labels. However, in the implementation of the present embodiment, larger values for S (S>1, i.e., multiple switching) are used which leads to a significant improvement in efficiency without any loss in performance.

$L_2$-SVM-MFN on large sparse datasets combined with the efficiency gained from seeding w in the re-training steps (after switching labels or after increasing $\lambda'$) is very effective. Consider an iteration in Loop 2 of TSVM where a new pair of labels has been switched, and the solution w from the last retraining of $L_2$-SVM-MFN (marked as Re-training 2 in FIG. 8) is available for seeding. When the last $L_2$-SVM-MFN converged, its solution w is given by the linear systems:

$$[\lambda I + X_{I(w)}^T C_{I(w)} X_{I(w)}]w = X_{I(w)}^T C_{I(w)} Y$$

where Y is the current label vector. When labels $Y_i, Y_j$ are switched, back at the top of loop 2, the label vector is updated as:

$$Y = Y + 2e_{ij}$$

where $e_{ij}$ is a vector whose elements zero everywhere except in the $i^{th}$ and the $j^{th}$ position which are +1 and −1 or −1 and +1 respectively. Note also that if $i,j \in j(w)$ the re-training of $L_2$-SVM-MFN with w as the starting guess immediately encounters a call CGLS to solve the following perturbed system:

$$[\lambda I + X_{j(w)}^T C_{j(w)} X_{j(w)}]\bar{w} = X_{j(w)}^T C_{j(w)} [Y + 2e_{ij}]$$

The starting residual vector $r^0$ is given by:

$$r^0 = X_{j(w)}^T C_{j(w)}[Y + 2e_{ij}] - [\lambda I + X_{j(w)}^T C_{j(w)} X_{j(w)}]w$$

$$= r(w) + 2X_{j(w)}^T C_{j(w)} e_{ij}$$

$$\leq \epsilon + 2\lambda'\|x_i - x_j\|$$

where r(w) in the second step is the final residual of w which fell below $\epsilon$ at the convergence of the last re-training. In applications, such as text categorization, TFIDF feature vectors are often length normalized and have positive entries. Therefore, $\|x_i-x_j\| \geq \sqrt{2}$. This gives the following bound on the starting residual:

$$r^0 \geq \epsilon + 2\sqrt{2}\lambda'$$

which is much smaller than a bound of $n\sqrt{n}\lambda'$ with a zero starting vector. Seeding is quite effective for Loop 1 as well, where $\lambda'$ is changed. With the two additional loops, the complexity of Transductive $L_2$-TSVM-MFN becomes $O(n_{switches} \bar{t}_{mfn}\bar{t}_{cgls}n_0)$, where $n_{switches}$ is the number of label switches. The outer loop executes a fixed number of times; the inner loop calls $L_2$-TSVM-MFN $n_{switches}$ times. Typically, $n_{switches}$ is expected to strongly depend on the data set and also on the number of labeled examples. Since it is difficult to apriori estimate the number of switches, this is an issue that is best understood from empirical observations.

Mean Field Annealing

The transductive SVM loss function over the unlabeled examples can be seen from FIG. 7 to be non-convex. This makes the TSVM optimization procedure susceptible to local minimum issues causing a loss in its performance in many situations. A new algorithm that is based on mean field annealing can be used to overcome this problem while also being computationally very attractive for large scale applications.

Mean field annealing (MFA) is an established tool for combinatorial optimization that approaches the problem from information theoretic principles. The discrete variables in the optimization problem are relaxed to continuous probability variables and a non-negative temperature parameter T is used to track the global optimum.

First, the TSVM objective function is re-written as follows:

$$w^* = \underset{w \in \mathbb{R}^d, \{\mu_j \in \{0,1\}\}_{j=1}^u}{\operatorname{argmin}} \frac{\lambda}{2}\|w\|^2 + \frac{1}{2l}\sum_{i=1}^l \max[0, 1 - y_i(w^T x_i)]^2 +$$

$$\frac{\lambda'}{2u}\sum_{j=1}^u \left(\mu_j \max[0, 1 - (w^T x'_j)]^2 + (1 - \mu_j)\max[0, 1 + (w^T x'_j)]^2\right)$$

Binary valued variables $\mu_j=(1+y_j)/2$ are introduced. Let $p_j \in [0,1]$ denote the probability that the unlabeled example belongs to the positive class. The Ising model 10 of Mean field annealing motivates the following objective function, where the binary variables $\mu_j$ are relaxed to probability variables $p_j$, and include entropy terms for the distributions defined by $p_j$:

$$w_T^* = \underset{w \in \mathbb{R}^d, \{p_j \in [0\ 1]\}_{j=1}^u}{\operatorname{argmin}} \frac{\lambda}{2}\|w\|^2 + \frac{1}{2l}\sum_{i=1}^l \max[0, 1 - y_i(w^T x_i)]^2 + \tag{8}$$

$$\frac{\lambda'}{2u}\sum_{j=1}^u \left(p_j \max[0, 1 - (w^T x'_j)]^2 + (1 - p_j)\max[0, 1 + (w^T x'_j)]^2\right) +$$

$$\frac{T}{2u}\sum_{j=1}^u (p_j \log p_j + (1 - p_j)\log(1 - p_j))$$

The "temperature" T parameterizes a family of objective functions. The objective function for a fixed T is minimized under the following class balancing constraints:

$$\frac{1}{u}\sum_{j=1}^u p_j = r \tag{9}$$

where r is the fraction of the number of unlabeled examples belonging to the positive class. As in TSVM, r is treated as a user-provided parameter. It may also be estimated from the labeled examples.

The solution to the optimization problem above is tracked as the temperature parameter T is lowered to 0. The final solution is given as:

$$w^* = \lim_{T \to 0} w_T^* \tag{10}$$

In practice, the system (indexer 104) monitors the value of the objective function in the optimization path and returns the solution corresponding to the minimum value achieved.

Figure 9:
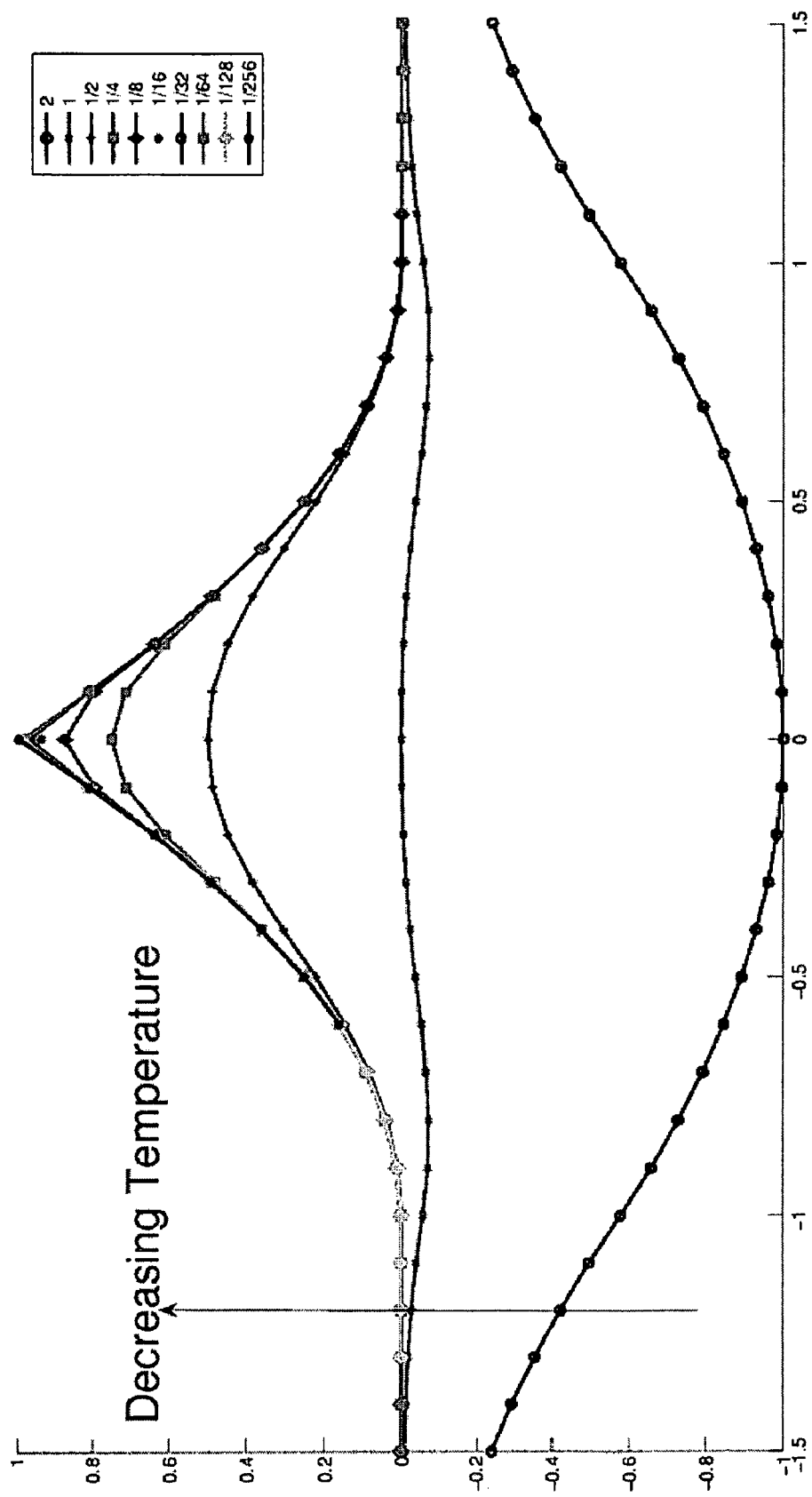
FIG. 9 is a graph illustrating an $L_2$ loss function over unlabelled examples for transductive SVM.

To develop an intuition for this method, the loss term is considered in the objective function associated with an unlabeled example as a function of the output of the classifier. This loss term is based on calculations to be described below. FIG. 9 plots this loss term for various values of T. As the temperature is decreased, the loss function deforms from a squared-loss shape where a global optimum is easier to achieve, to the TSVM loss function in FIG. 7. At high temperatures a global optimum is easier to obtain. The global minimizer is then slowly tracked as the temperature is lowered towards zero.

The optimization is done in stages, starting with high values of T and then gradually decreasing T towards 0. For each T, the problem in equations 8,9 is optimized by alternating the minimization over w and $p=[p_1 \ldots p_u]$ respectively. Fixing p, the optimization over w is done by $L_2$-SVM-MFN. Fixing w, the optimization over p can also be done easily as described below. Both these problems involve convex optimization and can be done exactly and efficiently. Details of these optimization steps follow.

Optimizing w

Described are the steps to efficiently implement the $L_2$-SVM-MFN loop for optimizing w keeping p fixed. The call to $L_2$-SVM-MFN is made on the data $\tilde{X}=[X^T X'^T X'^T]^T$ whose first l rows are formed by the labeled examples, and the next 2u rows are formed by the unlabeled examples appearing as two repeated blocks. The associated label vector and cost matrix are given by $$\hat{Y} = \left[y_1, y_2 \ldots y_l, \overbrace{1, 1, \ldots 1}^{u}, \overbrace{-1, -1, \ldots -1}^{u}\right] \tag{11}$$

$$C = \operatorname{diag}\left[\overbrace{\frac{1}{l} \ldots \frac{1}{l}}^{l}, \frac{\lambda' p_1}{u} \ldots \frac{\lambda' p_u}{u}, \overbrace{\frac{\lambda'(1-p_1)}{u} \ldots \frac{\lambda'(1-p_u)}{u}}^{u}\right]$$

Even though each unlabeled data contributes two terms to the objective function, effectively only one term contributes to the complexity. This is because matrix-vector products, which form the dominant expense in $L_2$-SVM-MFN, are performed only on unique rows of a matrix. The output may be duplicated for duplicate rows.

In fact, the CGLS calls in $L_2$-SVM-MFN can be re-written so that the unlabeled examples appear only once in the data matrix. The CGLS call at some iteration where the active index set is j=j(w) for some current candidate weight vector w is as follows:

$$[\lambda I + \hat{X}_j^T C_j \hat{X}_j]\overline{w} = \hat{X}^T C_j \hat{Y}_j \quad (12)$$

Note that if $|w^T x'_j| \geq 1$, the unlabeled example $x'_j$ appears as one row in the data matrix $\hat{X}_j$ with label given by $-\text{sign}(w^T x'_j)$. If $|w^T x'_j| < 1$, the unlabeled example $x'_j$ appears as two identical rows $x'_j$ with both labels. Let $j_i \in 1 \ldots l$ be the indices of the labeled examples in the active set, $j'_1 \in 1 \ldots u$ be the indices of unlabeled examples with $|w^T x'_j| \geq 1$ and $j'_2 \in 1 \ldots u$ be the indices of unlabeled examples with $|w^T x'_j| < 1$. Note that the index of every unlabeled example appears in one of these sets i.e., $j'_1 \cup j'_2 = 1 \ldots u$. Equation 12 may be re-written as:

$$\left[\lambda I + \frac{1}{l}\sum_{i \in j_l} x_i^T x_i + \frac{\lambda'}{u}\sum_{j \in j'_1} c_j x_j'^T x_j + \frac{\lambda'}{u}\sum_{j \in j'_2} x_j'^T x_j\right] \overline{w} =$$

$$\frac{1}{l}\sum_{i \in j_l} y_i x_i - \frac{\lambda'}{u}\sum_{j \in j'_1} c_j \text{sign}(w^T x_j) x_j + \frac{\lambda'}{u}\sum_{j \in j'_2} (2p_j - 1)x_j$$

where $c_j = p_j$ if $\text{sign}(w^T x'_j) = -1$ and $c_j = 1 - p_j$ if $\text{sign}(w^T x'_j) = 1$. Rewriting in matrix notation, an equivalent linear system is obtained that can be solved by CGLS:

$$[\lambda I + \overline{X}^T \overline{C} \overline{X}]\overline{w} = \overline{X}^T \overline{C} \overline{Y} \quad (13)$$

where $\overline{X} = [X_{ji}^T X']$, $\overline{C}$ is a diagonal matrix and $\overline{Y}$ is the vector of effectively active labels. Each of these data objects have l+u rows. These are given by:

$$\overline{C}_{jj} = \frac{1}{l}, \overline{Y}_j = y_i \; j \in 1 \ldots |j_l| \quad (14)$$

$$\overline{C}_{(j+|j_l|)(j+|j_l|)} = \frac{\lambda' p_j}{u}, \overline{Y}_{j+|j_l|} = 1 \text{ if } j \in 1 \ldots u,$$

$$j \in j'_1, \text{sign}(w^T x'_j) = -1$$

$$\overline{C}_{(j+|j_l|)(j+|j_l|)} = \frac{\lambda'(1-p_j)}{u},$$

$$\overline{Y}_{j+|j_l|} = -1 \text{ if } j \in 1 \ldots u \; j \in j'_1, \text{sign}(w^T x'_j) = 1$$

$$\overline{C}_{(j+|j_l|)(j+|j_l|)} = \frac{\lambda'}{u}, \overline{Y}_{j+|j_l|} = (2p_j - 1) \text{ if } j \in 1 \ldots u \; j \in j'_2$$

Thus, CGLS needs to only operate on data matrices with one instance of each unlabeled example using a suitably modified cost matrix and label vector.

After the CGLS step, the optimality conditions are checked. The optimality conditions can be re-written as:

$$\forall i \in j_l, y_i \overline{o}_i \leq 1 + \epsilon$$

$$\forall i \in j_l^c, y_i \overline{o}_i \geq 1 - \epsilon$$

$$\forall j \in j'_1, |\overline{o}'_j| \geq 1 - \epsilon$$

$$\forall j \in j'_2, |\overline{o}'_j| \leq 1 + \epsilon$$

For the subsequent line search step, appropriate output and label vectors are reassembled to call the routine in the table of FIG. 5. The steps for optimizing w: are outlined in the table of FIG. 10.

Optimizing p

For the latter problem of optimizing p for a fixed $w_i$, the Lagrangian is constructed:

$$\mathcal{L} = \frac{\lambda'}{2u}\sum_{j=1}^{u} \left(p_j \max[0, 1 - (w^T x'_j)]^2 + (1+p_j)\max[0, 1(w^T x'_j)]^2\right) +$$

$$\frac{T}{2u}\sum_{j=1}^{u}(p_j \log p_j + (1-p_j)\log(1-p_j)) - v\left[\frac{1}{u}\sum_{j=1}^{u} p_j - r\right]$$

Differentiating the Lagrangian with respect to $p_j$, the following is obtained:

$$\frac{\partial \mathcal{L}}{\partial p_j} = \frac{\lambda'}{2u}(\max[0, 1-(w^T x'_j)]^2 - \max[0, 1+(w^T x'_j)]^2) +$$

$$\frac{T}{2u} \log \frac{p_j}{1-p_j} - \frac{v}{u} = 0$$

Defining $$g_j = \lambda'(\max[0, 1-(w^T x'_j)]^2 - \max[0, 1+(w^T x'_j)]^2),$$

the expression for $p_j$ is given by:

$$p_j = \frac{1}{1 + e^{\frac{g_j - 2v}{T}}} \quad (15)$$

Substituting this expression in the balance constraint in equation 9, a one-dimensional non-linear equation in v is as follows:

$$\frac{1}{u}\sum_{j=1}^{u} \frac{1}{1 + e^{\frac{g_j - 2v}{T}}} = r$$

The value of 2 v is computed exactly by using a hybrid combination of Newton-Raphson iterations and the bisection method to find the root of the function $$B(v) = \frac{1}{u}\sum_{i=l+1}^{l+u} \frac{1}{1 + e^{\frac{g_i - v}{T}}} - r.$$

Figure 11:
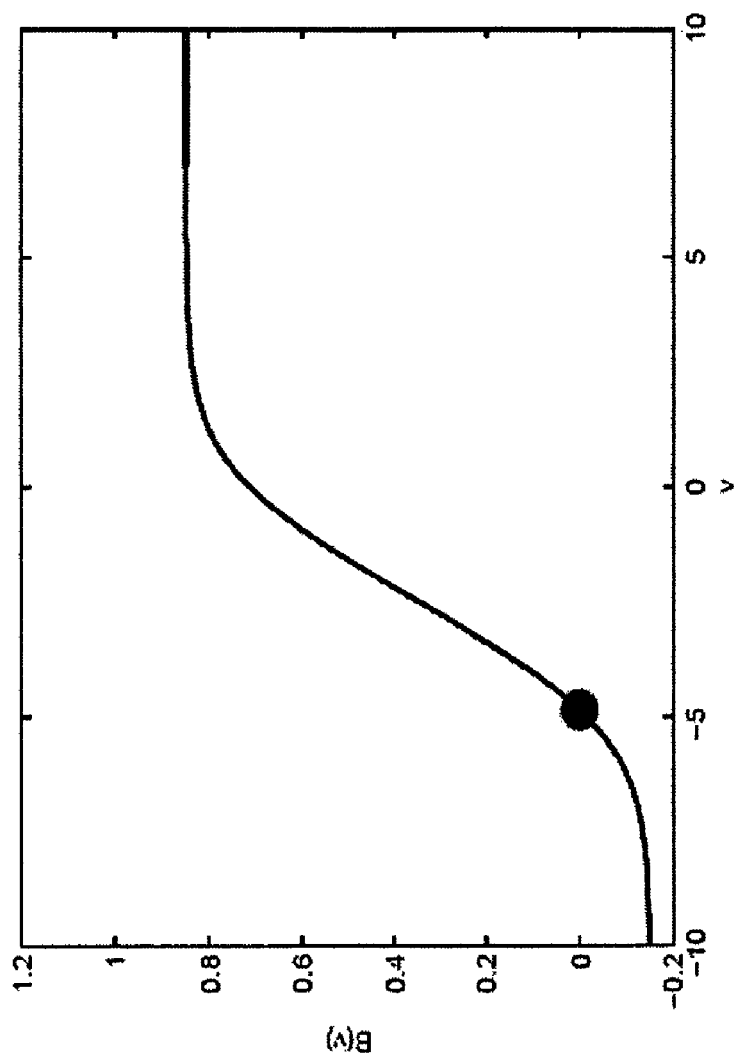
FIG. 11 is a graph of a root function used by an embodiment.

This method is rapid due to the quadratic convergence properties of Newton-Raphson iterations and fail-safe due to bisection steps. Note that the root exists and is unique, since one can see that $B(v) \to 1-r > 0$ when $v \to \infty$, $B(v) \to -r < 0$ when $v \to -\infty$, and B(v) is a continuous, monotonically increasing function, as shown in FIG. 11. The root finding begins by bracketing the root in the interval $[v_-, v_+]$ so that $B(v_-) < 0$, $B(v_+) > 0$ where $v_-, v_+$ are given by:

$$v_- = \min(g_1 \ldots g_l) - T \log \frac{1-r}{r}$$

$$v_+ = \max(g_1 \ldots g_u) - T \log \frac{1-r}{r}$$

The hybrid root finding algorithm performs Newton-Raphson iterations with a starting guess of $$\frac{v_- + v_+}{2}$$

and invokes the bisection method whenever an iterate goes outside the brackets. The steps for optimizing p are outlined in table if FIG. 12.

Stopping Criteria

For a fixed T, this alternate minimization proceeds until some stopping criterion is satisfied. A natural criterion is the known mean Kullback-Liebler divergence (relative entropy) KL(p,q) between current values of $p_i$ and the values, say $q_{i1}$, at the end of last iteration. Thus the stopping criterion for fixed T is:

$$KL(p, q) = \sum_{j=1}^{u} p_j \log \frac{p_j}{q_j} + (1-p_j) \log \frac{1-p_j}{1-q_j} < u\epsilon \qquad (16)$$

A good value for $\epsilon$ is $10^{-6}$. The temperature may be decreased in the outer loop until the total entropy falls below a threshold T, which is also taken to be $10^{-6}$:

$$H(p) = -\sum_{j=l}^{u} (p_j \log p_j + (1-p_j) \log(1-p_j)) < u\epsilon \qquad (17)$$

The TSVM objective function is monitored as the optimization proceeds.

$$J(w) = \qquad (18)$$
$$\frac{\lambda}{2}\|w\|^2 + \frac{1}{2l}\sum_{i=1}^{l} \max[0, 1-y_i(w^T x_i)]^2 + \frac{\lambda'}{2u}\sum_{j=1}^{u} \max[0, 1-|w^T x'_j|]^2$$

The weight vector corresponding to the minimum transductive cost is returned as the solution. The steps of mean field annealing with $L_2$-SVM-MFN are outlined in the table of FIG. 13.

Application to One-Class Problems

The transductive SVM and mean field annealing algorithms described above can be deployed in a variety of settings involving different amounts of labeled and unlabeled data. Many settings present the task of identifying members of a certain class as opposed to distinguishing between well-specified classes. For example, in order to identify web documents concerning sports, it is much easier to label sports documents than to label the diverse and ill-characterized set of non-sports documents. In such problems, labeled examples come from a single class, very often with large amounts of unlabeled data containing some instances of the class of interest and many instances of the "others" class.

Being a special case of semi-supervised learning, the problem of one-class learning with unlabeled data can be addressed by the algorithms developed in this paper. These algorithms implement the cluster assumption under constraints on class ratios. For one-class problems, unlabeled data is expected to be helpful in biasing the classification hyperplane to pass through a low density region keeping clusters of the relevant class on one side and instances of the "others" class on the other side. The fraction r can first be crudely estimated using a small random sample and then finely adjusted based on validation performance of the trained classifier.

The various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A computerized method for semi-supervised learning for web page classification, comprising:
   receiving a set of web pages as training elements;
   labeling some of the elements of the set of training elements that are determined to fall within a classification group, the set of training elements thereby having labeled elements and unlabeled elements;
   using selected labeled elements and unlabeled elements as examples in a semi-supervised support vector machine implemented using a mean field annealing method, constructing a continuous loss function from a non-continuous loss function, train a linear classifier;
   receiving unclassified web pages; and
   classifying the unclassified web pages using the trained linear classifier.

2. The method of claim 1, wherein the number of unlabeled elements in the set of training elements that fall within the classification group is specified as an estimate.

3. The method of claim 1, wherein the semi-supervised support vector machine uses a finite Newton method for fast training.

4. The method of claim 3, wherein a step $\overline{w}^{(k)} = w^{(k)} + n^{(k)}$ in the finite Newton method for determining a weight vector w in a k-th iteration, with n being a Newton step, is given by solving the following linear system associated with a weighted linear regularized least squares problem over a data subset defined by a set of active indices $j(w^{(k)})$:

$$[\lambda I + X_{j(w^{(k)})}^T C_{j(w^{(k)})} X_{j(w^{(k)})}] \overline{w}^{(k)} = X_{j(w^{(k)})}^T C_{j(w^{(k)})} Y_{j(w^{(k)})}$$

where I is the identity matrix, and wherein once $\overline{w}^{(k)}$ is obtained, $w^{(k+1)}$ is obtained from $w^{(k+1)} = w^{(k)} + \delta^{(k)} n^{(k)}$ by setting $w^{(k+1)} = w^{(k)} + \delta^k(\overline{w}^{(k)} - w^{(k)})$ after performing an exact line search for $\delta^k$, which is by exactly solving a one-dimensional minimization problem:

$$\delta^{(k)} = \underset{\delta \geq 0}{\operatorname{argmin}} f(w^{(k)} + \delta(\overline{w}^{(k)} - w^{(k)})).$$

5. The method of claim 4, wherein the modified Newton method uses a conjugate gradient for least squares method to solve large, sparse, weighted regularized least squares problem.

6. The method of claim 1, wherein the semi-supervised support vector machine is implemented using a modified finite Newton method with one or multiple switching of labels of unlabeled example elements from the training set.

7. The method of claim 6, wherein the objective function is as follows $$w^* = \underset{w \in \mathbb{R}^d, \{y'_j \in \{-1,+1\}\}_{j=1}^u}{\operatorname{argmin}} \frac{\lambda}{2}\|w\|^2 +$$

$$\frac{1}{2l}\sum_{i=1}^{l} \max[0, 1 - y_i(w^T x_i)]^2 + \frac{\lambda'}{2u}\sum_{j=1}^{u} \max[0, 1 - y'_j(w^T x'_j)]^2$$

$$\text{subject to: } \frac{1}{u}\sum_{j=1}^{u} \max[0, \operatorname{sign}(w^T x'_j)] = r.$$

8. The method of claim 7, comprising of optimizing w for fixed $y'_j$ using the finite Newton method.

9. The method of claim 8, wherein a step $\overline{w}^{(k)} = w^{(k)} + n^{(k)}$ in the finite Newton method for determining a weight vector w in a k-th iteration, with n being a Newton step, is given by solving the following linear system associated with a weighted linear regularized least squares problem over a data subset defined by a set of active indices $j(w^{(k)})$:

$$[\lambda I + X_{j(w^{(k)})}^T C_{j(w^{(k)})} X_{j(w^{(k)})}] \overline{w}^{(k)} = X_{j(w^{(k)})}^T C_{j(w^{(k)})} Y_{j(w^{(k)})}$$

where I is the identity matrix, and wherein once $\overline{w}^{(k)}$ is obtained, $w^{(k+1)}$ is obtained from $w^{(k+1)} = w^{(k)} + \delta^{(k)} n^{(k)}$ by setting $w^{(k+1)} = w^{(k)} + \delta^k(\overline{w}^{(k)} - w^{(k)})$ after performing an exact line search for $\delta^k$, which is by exactly solving a one-dimensional minimization problem:

$$\delta^{(k)} = \underset{\delta \geq 0}{\operatorname{argmin}} f(w^{(k)} + \delta(\overline{w}^{(k)} - w^{(k)})).$$

10. The method of claim 9, wherein the modified Newton method uses a conjugate gradient for least squares method to solve large, sparse, weighted regularized least squares problem.

11. The method of claim 7, comprising of optimizing $y'_j$ for a fixed w by switching one or more pairs of labels.

12. The method of claim 1, wherein a step $\overline{w}^{(k)} = w^{(k)} + n^{(k)}$ in the finite Newton method for determining a weight vector w in a k-th iteration, with n being a Newton step, is given by solving the following linear system associated with a weighted linear regularized least squares problem over a data subset defined by a set of active indices $j(w^{(k)})$:

$$[\lambda I + X_{j(w^{(k)})}^T C_{j(w^{(k)})} X_{j(w^{(k)})}] \overline{w}^{(k)} = X_{j(w^{(k)})}^T C_{j(w^{(k)})} Y_{j(w^{(k)})}$$

where I is the identity matrix, and wherein once $\overline{w}^{(k)}$ is obtained, $w^{(k+1)}$ is obtained from $w^{(k+1)} = w^{(k)} + \delta^{(k)} n^{(k)}$ by setting $w^{(k+1)} = w^{(k)} + \delta^k(\overline{w}^{(k)} - w^{(k)})$ after performing an exact line search for $\delta^k$, which is by exactly solving a one-dimensional minimization problem:

$$\delta^{(k)} = \underset{\delta \geq 0}{\operatorname{argmin}} f(w^{(k)} + \delta(\overline{w}^{(k)} - w^{(k)})).$$

13. The method of claim 12, wherein the modified Newton method uses a conjugate gradient for least squares method to solve large, sparse, weighted regularized least squares problem.

14. The method of claim 1, comprising relaxing discrete variables to continuous probability variables in mean field annealing method, wherein a non-negative temperature parameter T is used to track a global optimum.

15. The method of claim 14, comprising writing a semi-supervised support vector objective as follows:

$$w^* = \underset{w \in \mathbb{R}^d, \{\mu_j \in \{0,1\}\}_{j=1}^u}{\operatorname{argmin}} \frac{\lambda}{2}\|w\|^2 + \frac{1}{2l}\sum_{i=1}^{l} \max[0, 1 - y_i(w^T x_i)]^2 +$$

$$\frac{\lambda'}{2u}\sum_{j=1}^{u} \left(\mu_j \max[0, 1 - (w^T x'_j)]^2 + (1 - \mu_j)\max[0, 1 + (w^T x'_j)]^2\right)$$

wherein binary valued variables $\mu_j = (1+y_j)/2$ are introduced, $p_j \in [0,1]$ denote the belief probability that the unlabeled example belongs to the positive class, l is the number of labeled example elements, u is the number of unlabeled example elements, wherein $\lambda$ and $\lambda'$ are regularization parameters, and the Ising model of mean field annealing motivates the following objective function, where the binary variables $\mu_j$ are relaxed to probability variables $p_j$, and include entropy terms for the distributions defined by $p_j$:

$$w_T^* = \underset{w \in \mathbb{R}^d, \{p_j \in [0,1]\}_{j=1}^u}{\operatorname{argmin}} \frac{\lambda}{2}\|w\|^2 + \frac{1}{2l}\sum_{i=1}^{l} \max[0, 1 - y_i(w^T, x_i)]^2 + \quad (8)$$

$$\frac{\lambda'}{2u}\sum_{j=1}^{u} \left(p_j \max[0, 1 - (w^T x'_j)]^2 + (1 - p_j)\max[0, 1 + (w^T x'_j)]^2\right) +$$

$$\frac{T}{2u}\sum_{j=1}^{u} (p_j \log p_j + (1 - p_j) \log (1 - p_j))$$

wherein the temperature T parameterizes a family of objective functions, wherein the objective function for a fixed T is minimized under the following class balancing constraints:

$$\frac{1}{u}\sum_{j=1}^{u} p_j = r$$

where r, the fraction of the number of unlabeled examples belonging to the positive class.

16. The method of claim 15, wherein the solution to the optimization problem is tracked as the temperature parameter T is lowered to 0, wherein the final solution is given as:

$$w^* = \lim_{T \to 0} w_T^*.$$

17. The method of claim 16, comprising optimizing W keeping p fixed, wherein the call to finite Newton method is made on data $\hat{X} = [X^T X'^T X'^T]^T$ whose first l rows are formed by labeled examples, and the next 2u rows are formed by unlabeled examples appearing as two repeated blocks, wherein the associated label vector and cost matrix are given by:

$$\hat{Y} = \left[y_1, y_2 \ldots y_l, \overbrace{1,1,\ldots 1}^{u}, \overbrace{-1,-1,\ldots -1}^{u}\right]$$

$$C = \operatorname{diag}\left[\underbrace{\frac{1}{l}\ldots\frac{1}{l}}_{l}, \underbrace{\frac{\lambda' p_1}{u}\ldots\frac{\lambda' p_u}{u}}_{u}, \underbrace{\frac{\lambda'(1-p_1)}{u}\ldots\frac{\lambda'(1-p_u)}{u}}_{u}\right]$$

where $y_1, y_2 \ldots y_l$ are labels of the labeled example elements.

18. The method of claim 15, comprising optimizing p for a fixed w, a Lagrangian is constructed using Lagrangian multiplier v as follows:

$$\mathcal{L} = \frac{\lambda'}{2u}\sum_{j=1}^{u} \left(p_j \max[0, 1-(w^T x'_j)]^2 + (1-p_j)\max[0, 1+(w^T x'_j)]^2\right) +$$

$$\frac{T}{2u}\sum_{j=1}^{u}(p_j \log p_j + (1-p_j)\log(1-p_j)) - v\left[\frac{1}{u}\sum_{j=1}^{u} p_j - r\right]$$

wherein, differentiating the Lagrangian with respect to $p_j$, produces:

$$\frac{\partial \mathcal{L}}{\partial p_j} = \frac{\lambda'}{2u}\left(\max[0, 1-(w^T x'_j)]^2 - \max[0, 1+(w^T x'_j)]^2\right) +$$

$$\frac{T}{2u}\log\frac{p_j}{1-p_j} - \frac{v}{u} = 0$$

defining $$g_j = \lambda'(\max[0,1-(w^T x'_j)]^2 - \max[0,1+(w^T x'_j)]^2),$$

wherein the expression for $p_j$ is given by:

$$p_j = \frac{1}{1 + e^{\frac{g_j - 2v}{T}}}$$

wherein, substituting the expression for $p_j$ in the balance constraint, a one-dimensional non-linear equation in v is as follows:

$$\frac{1}{u}\sum_{j=1}^{u} \frac{1}{1 + e^{\frac{g_j - 2v}{T}}} = r$$

wherein the value of v is computed exactly by using a hybrid combination of Newton-Raphson iterations and the bisection method to find the root of the function $$B(v) = \frac{1}{u}\sum_{i=l+1}^{l+u} \frac{1}{1 + e^{\frac{g_i - v}{T}}} - r.$$

19. A system for semi-supervised learning for web page classification, comprising:

an input device operative to receive a set of web pages as training elements;

a processor operative to label some of the elements of the set of training elements that are determined to fall within a classification group, the set of training elements thereby having labeled elements and unlabeled elements;

the processor further operative to use selected labeled elements and unlabeled elements as examples in a semi-supervised support vector machine implemented using a mean field annealing method, constructing a continuous loss function from a non-continuous loss function, to train a linear classifier;

the input device further operative to receive unclassified web pages; and the processor further for operative to classify the received unclassified web pages using the trained linear classifier.

20. A computer program product stored on a computer-readable medium having instructions for performing a semi-supervised learning method for web page classification, the method comprising:

receiving a set of web pages as training elements;

labeling some of the elements of the set of training elements that are determined to fall within a classification group, the set of training elements thereby having labeled elements and unlabeled elements;

using selected labeled elements and unlabeled elements as examples in a semi-supervised support vector machine implemented using a mean field annealing method, constructing a continuous loss function from a non-continuous loss function, to train a linear classifier;

receiving unclassified web pages; and classifying the unclassified web pages using the trained linear classifier.

* * * * *